United States Patent Office 3,438,056
Patented Apr. 8, 1969

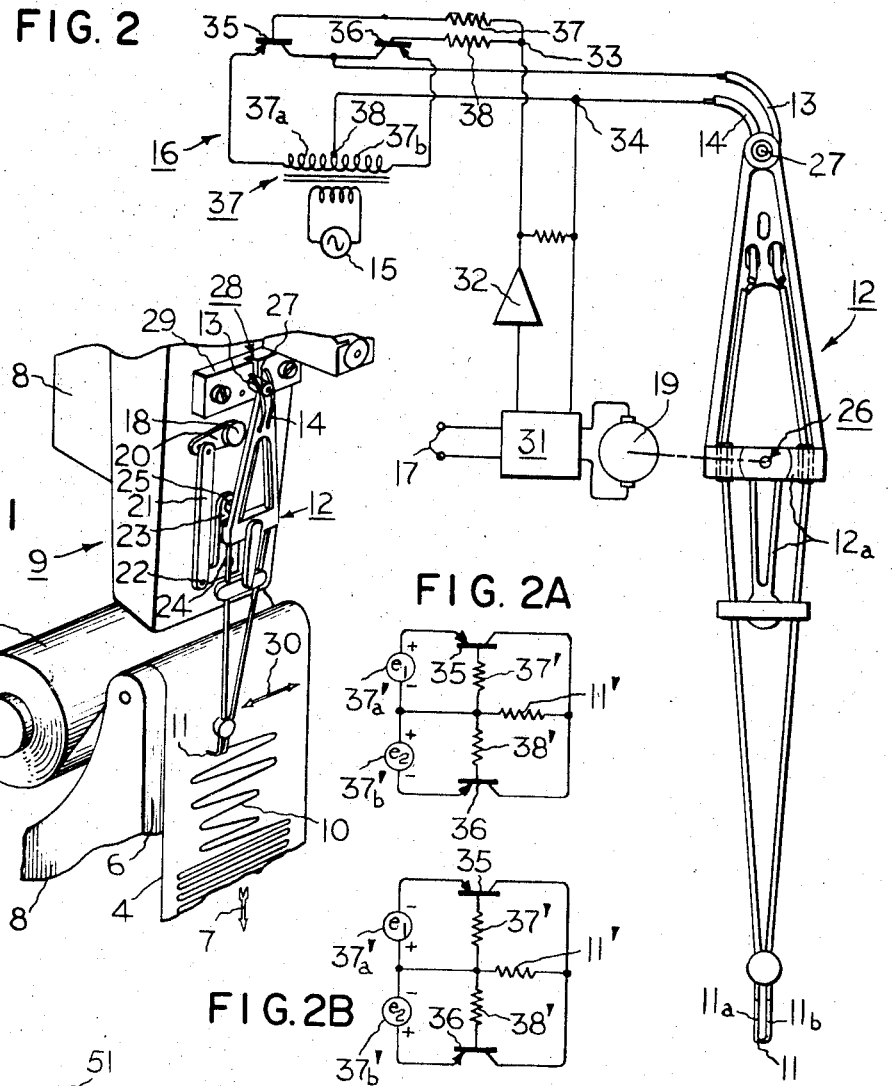

3,438,056
TEMPERATURE REGULATION OF
THERMAL RECORDING
Albion P. Bjork, Bedford, Mass., assignor to BLH
Electronics, Inc., Waltham, Mass., a corporation
of Delaware
Filed Apr. 14, 1967, Ser. No. 630,985
Int. Cl. G01d 15/10
U.S. Cl. 346—76                           13 Claims

ABSTRACT OF THE DISCLOSURE

A compensated supply of heating-mode D-C electrical power to a Peltier-junction thermal recorder stylus is derived from an A-C source by way of controlled semiconductors which are automatically biased to establish heating currents related to frequency and amplitude of stylus motions and thereby compensate for varying heat losses from the stylus while input signals of different frequency and amplitude are being recorded.

BACKGROUND OF THE INVENTION

The present invention relates to improvement of the quality of recording of data upon heat-sensitive media via electrically-heated stylus members which are automatically controlled in temperature to produce optimum records of significantly-different signals, and, in one particular aspect, to novel and improved thermal oscillographic recorders in which the frequency and amplitude of stylus-actuating signals are related to the heating-mode electrical power applied to a Peltier-junction stylus, and in which economical, accurate and fast-response regulation of stylus D-C heating power is exercised through controlled semiconductor rectification of an A-C supply.

It has long been well known to record intelligence by way of permanent traces or writings upon a circular or strip chart of thermally-responsive paper with a heated stylus. In one generally conventional practice, a record medium in the form of a chart of heat-sensitive paper is motor-driven at a selected rate, and the associated stylus incorporating an electrically-heated pen or nib is caused to make arcuate or rectilinear excursions along the chart surface in response to mechanical actuations by a motive device which is energized by electrical signals characterizing a measured condition such as pressure, temperature, current, and so forth. Such a thermal type of oscillographic recorder is preferable to the usual inking type recorders in many applications where it is desirable to obviate need for replenishing an ink supply, and where the problems of ink clogging, puddling, straining and spilling are to be overcome.

A common pointed or ribbon stylus of resistance material tends to experience rather significant cooling when oscillated rapidly and with large amplitudes, both as the result of convection in relation to ambient atmosphere and of conduction in relation to the adjoining chart arrangement, such that larger amounts of heating power are required to insure adequate writing under these operating conditions than when the stylus is moved only relatively slowly. However, that same supply of power can be excessive under the latter conditions, inasmuch as the stylus tends to overheat with consequent scorching of or inordinately wide writing upon the chart. Electrical power drain is obviously highly wasteful at such times, also. If the resistance-wire cross-section is reduced in an effort to minimize these difficulties, the stylus nib then becomes undesirably fragile and more troublesome to fabricate. Another proposal, intended to squelch heating at certain times, has involved cooling in accordance with the well-known Peltier effect; however, the stylus excitation currents must then be alternated in synchronism with those discrete times when heating and cooling are required and at slow enough rates to accommodate thermal lags. An advantageous type of automatic self-regulation of stylus nib heat conditions can be realized through exploitation of a stylus having a Peltier junction of dissimilar materials located at the writing point and energized by current which continuously operates the junction in the heat-emitting (vs. cooling) mode. This beneficial self-regulation occurs because of the fact that the heating effect in the junction is decreased. Because the thermoelectric voltage and with the temperature of that junction. Thus, when the junction is inherently caused to be lowered in temperature, as is the case for high-speed writing conditions, and when the junction is fed from a low-impedance source of power, the thermoelectric voltage in the thermocouple junction is decreased. Because the thermo-electric voltage is of a sense which opposes the supply voltage which forces the current through the junction, the stylus current becomes increased and thereby increases the heating rate, as desired. The effects are of opposite sense for low-speed writing conditions, and thus the advantageous tendency is then toward reduction of the heating rate. Nevertheless, for optimum refinement of the thermal writing, it can be important that even the aforementioned reverse-Peltier stylus, operated continuously in the heat-emitting mode, be further automatically controlled in excitation.

A Peltier-effect stylus of the aforementioned type, and details concerning suitable construction, are also disclosed in a copending U.S. patent application Ser. No. 440,810, filed Mar. 18, 1965, for "Thermal Recording" in the names of Albion P. Bjork and Cosmo Abbondante, now U.S. Patent No. 3,334,352.

SUMMARY

In both the reverse-Peltier stylus and in the simple resistance-wire stylus, the type of automatic compensation required of auxiliary power supply equipment is substantially the same, and, in accordance with the present teachings, the unique principles upon which automatic compensation is based can be adapted to effect like results in either form of thermal writing system. Among the underlying recognitions which find expression in the present invention are those which relate the needs of stylus power excitation, and hence heat output, with the frequency and amplitude of the signals being recorded. By way of example, it has been established that a rapidly-alternating high-amplitude electrical measurement signal, which causes the stylus motor to drive the pen across the chart with wide rapid alternating excursions, may also be electronically resolved and characterized as a separate control signal which is capable of beneficial use in varying the power supplied to the pen. Collaterally, the expected difficulties associated with automatic adjustments of the output of a power supply are avoided through controlled rectification of A-C power in a simple form of network involving the pen as a load and the unique control signal as an automatically-varying bias. In the case of a reverse-Peltier stylus, the improved supply inherently provides only unidirectional currents which energize the junction in the desired heating mode.

It is one of the objects of the present invention to provide novel and improved thermal recording apparatus of economical and uncomplicated construction which operates efficiently to develop automatically the optimum writing temperatures required for recording of signals having significantly different frequency and amplitude characteristics.

Another object is to provide oscillographic recorder apparatus wherein characteristics of the information to be recorded are translated into related electrical control signals which automatically govern the electrical heating power delivered to a stylus.

A further object is to provide a unique high-precision thermal oscillographic recorder involving self-regulation of the heating, and hence writing conditions, of a stylus in accordance with the frequency and amplitude characteristics of signals being recorded.

An additional object is to provide a thermal recorder wherein a reverse-Peltier stylus is supplied with heating-mode current from an A-C supply under automatic electronic control of heat-regulating signals characterizing frequency and amplitude of recorded signals.

Still further, it is an object to improve the writing qualities of an electrically-heated stylus by sensing frequency and amplitude characteristics of information being recorded and automatically controlling the electrical heating power supplied to the stylus in accordance with such characteristics.

By way of a summary account of practice of this invention in one of its aspects, an oscillographic recorder includes a motor-driven chart of thermally-responsive material cooperating with a relatively-movable stylus having an electrically-heated nib and mechanically actuated by a motor unit in accordance with electrical input signals of which a record is to be traced. The same electrical input signals are rectified and applied to an integrating network from which are derived integrated output signals, the D-C values of which characterize a combination of both the frequency and amplitude of the input signals. In turn, these output signals are applied as bias which governs the conduction times of controlled semiconductors in a further network energized by an A-C supply and incorporating the nib impedance as a load. As the stylus is caused to trace records at high frequencies of oscillation and/or with high-amplitude excursions, the bias changes automatically to increase the power delivered to the nib, and, hence, to produce increased heating as called for by the more severe writing requirements; at other times, the power supplied to the stylus nib is appropriately lowered automatically and thus acts to reduce waste of power, deterioration of the nib, and scorching or unduly-wide marking of the sensitive chart.

BRIEF DESCRIPTION OF THE DRAWINGS

FIGURE 1 pictorially illustrates a portion of a high-speed strip-chart oscillographic recorder including a dynamically-actuated heated stylus.

FIGURE 2 presents a plan view of a heated stylus and holder assembly, together with a diagram, partly in block form, of excitation and automatic heater control circuitry.

FIGURE 2A is a schematic representation of operating conditions in a heater control circuit during one half cycle of A-C power excitation.

FIGURE 2B is a schematic representation of operating conditions in a heater control circuit during a different half cycle of A-C power excitation.

FIGURE 3 provides schematic circuit details of a preferred automatic heat controller for a thermal oscillographic recorder, together with an associated controlled-semiconductor power supply for an electrically-heated stylus.

DESCRIPTION OF THE PREFERRED EMBODIMENTS

The apparatus depicted in FIGURE 1 includes a number of features which will be recognized as generally-conventional counterparts of those commonly used in oscillographic recorders. Recording medium 4 is shown in a strip-chart configuration, being withdrawn from a supply roll 5 and moved across a back-up platen surface 6 at selected speeds in the direction of arrow 7 by suitable motive means (not illustrated). In addition to these elements, the framework or base structure 8 also supports a pen motor, motion-conversion and stylus assembly, 9, which serves to characterize the electrical input signals applied to the recorder in terms of a substantially permanent visible record or trace, 10, on the chart 4. For the latter purposes, the nib or writing end 11 of the movable stylus unit 12 is electrically energized, via leads 13 and 14, from an A-C electrical power source 15 which is under control of an automatic power-varying network 16 (both in FIGURE 2), and emits heat which will result in visible markings on the heat-sensitive medium 4 at each point of its contact with that medium. Thermally-sensitive record materials which will respond in the intended manner to yield heat-induced markings are of course well known, such as those involving wax-type surfaces.

In a generally conventional manner, the electrical input signals which are to be recorded are applied to input terminals 17 (FIGURE 2) and are translated into related angular movements of the armature shaft 18 (FIGURE 1) of a pen motor 19 (FIGURE 2); in turn, these movements are amplified by way of a lever arm 20 which is pivotally connected with a floating link 21 having a further pivotal connection, at 22, with an L-shaped rocker arm 23, the latter being pivoted at 24 for angular movements about an axis fixed in relation to the framework 8. End 25 of the rocker arm is pivotally pinned with the stylus frame 12$_a$ by way of the bore 26 (FIGURE 2) and thus tends to induce angular movements of the stylus about its end pivot 27; however, that end pivot is slidable in the narrow slot 28 of a stationary guide and pivot block 29, and also undergoes certain reciprocating movements in the direction of the slot. In accordance with well established design techniques, this rotary-to-rectilinear motion-conversion mechanism is proportioned and arranged to develop substantially linear reciprocating excursions of stylus nib 11, in directions 30 transverse to the direction 7 of strip-chart movement; the extents of these excursions, and speeds at which they take place, are in predetermined relationships to angular movements of the pen-motor armature and, in turn, to the amplitude and frequency, respectively, of the input signals applied to the recorder input terminals 17.

Electrically-heated writing nib 11 may, for example, comprise a length of resistance heater wire, or, as actually shown, a V-shaped composite of two dissimilar metal wire elements 11$_a$ and 11$_b$ which are integrated with one another by a spot-welded juncture appearing at the very tip. The dissimilar metals are those which are known to develop a substantial Peltier effect, such as the metals Chromel and Alumel, or the metals platinum and a platinum-rhodium alloy. This junction produces effects which are commonly attractive because of the heat-absorption, or cooling, capabilities which are developed when electrical current occurs in one direction through the junction; however, there is a reciprocal aspect to the Peltier cooling phenomenon which has to do with the emission of heat by a like junction when the current through it is in the reversed direction and thus involves what may be termed a "reverse-Peltier" mode of operation. For present purposes it is to be noted that the latter heating-mode operation requires an essentially unidirectional or net unidirectional current through the junction, this operation being particularly attractive inasmuch as the generated heat tends to be concentrated advantageously at the junction site at the writing tip of the nib. As has been noted hereinabove, there is also a beneficial self-regulation of current which tends to oppose excessive heating while at other times promoting increased heating when required to overcome losses. As an example in the latter connection, and it is true to some extent for the reverse-Peltier stylus and to a greater extent for the simple wire- or ribbon-type resistance heater stylus, it is found that a stationary or slowly-moving stylus will lose relatively smaller amounts of heat through convection than will be the case when the stylus moves very rapidly and with large excursions and thus experiences cooling effects of "windage" in relation to the ambient atmosphere. In addition, greater amounts of heat are conducted away from the nib as it moves quickly across new chart surfaces. Hence, fixed adjustment of heating current to produce a good quality trace under high-speed high-amplitude conditions may result in excessively-wide markings or scorching, and deterioration of the stylus, when the stylus is stationary or moves at only slow-speeds. Conversely, fixed lower adjustment of heating current to offset the latter tendencies can result in undesirably fine or missing records when the stylus is oscillated rapidly over a wide range of motion.

Both the frequency and amplitude of stylus oscillations are thus seen to be important factors in determining what stylus heat supply would be optimum at any time; further, the frequency and amplitude of the electrical input signals which are to be recorded are similarly related to the optimum instantaneous heating requirements. As is shown in FIGURE 2, the input appearing at terminals 17, and reproduced by a preamplifier 31 where one is used, is processed by a unit 32 which preferably performs rectification, integration and amplification, such that the voltages appearing at output point 33 in relation to a reference or system ground level of point 34 are of values increasing with both amplitude and frequency of the input signals, within at least certain relatively broad limits. These voltages exercise a desired control over the power delivered to stylus nib 11 via leads 13 and 14 from the A-C source 15 and its associated power-control circuitry 16 including the controlled semiconductor devices 35 and 36. For these control purposes, the output from A-C source 15 is coupled into circuitry 16 via a transformer 37 having the tap 38 between its secondary halves 37$_a$ and 37$_b$ connected with the stylus lead 14 which is also at the reference potential of system point 34. The ends of the secondary are respectively connected with the emitters of devices 35 and 36, both of which devices have their collectors connected in common with the other stylus lead, 13. The bases of devices 35 and 36 are respectively coupled to the control-voltage, or variable-biasing point, 33, through resistances 37 and 38. As the biasing voltage shifts in response to input signals having increased frequency and amplitude, the ON or conduction intervals of devices 35 and 36 increase and thereby cause more heating current to be delivered to nib 11, and conversely for reductions in frequency and amplitude. Current through nib 11 is advantageously unidirectional, such that nib 11 may take the described form of a reverse-Peltier element operated continuously in the heat-emitting mode.

Substantially equivalent schematic representations of the power-control circuitry appear in FIGURES 2A and 2B, wherein the supply voltages $e_1$ and $e_2$ corresponding to the voltages across secondary winding halves 37$_a$ and 38$_b$ (marked with distinguishing single-prime accents, as 37$_a$' and 37$_b$') are of instantaneously different polarities such as occur during different successive half-cycles of the supply. For the condition illustrated in FIGURE 2A, device 35 is forward biased, device 36 is reverse biased, and current is through the load 11' (including the resistance of nib 11) in a direction out of the collector of 35, as enabled by the fact that the load is small in comparison with base-coupled resistance 38', inasmuch as the collector diode portion of device 36 is forward biased. For the reversed-polarity excitation condition illustrated in FIGURE 2B, the considerations are comparable, and current is in a direction out of the collector of 36 and through the load 11' in the same direction as before, the load resistance being small in relation to the base-coupled resistance 37'. The unidirectional heating-mode current through the load is related to the transformer secondary voltages, and may be pre-set to establish a desired level of heating current by selecting or adjusting the resistance values of 37' and 38' which govern the forward bias of the semiconductor devices or equivalent electronic valves.

A preferred circuit embodiment for the equipment appears in FIGURE 3, where, as before, a pen motor 19 responds to electrical input signals, from a suitable input applying unit 39, and drives a pen including dissimilar-metal elements 11$_a$ and 11$_b$ across the thermally-responsive record medium 4 by way of a mechanical coupling 40. A-C power from a supply 41 is transformer-coupled into the rectifier-regulator control unit 42 by way of a transformer 43, the center-tap of the secondary of transformer 43 being connected to the system ground 44 and to stylus lead 14. Ends of the secondary winding are coupled to different ones of the emitters of controlled semiconductor devices 45 and 46, the collectors of these devices both being connected to the other stylus lead, 13. Bias resistances 47 and 48 associated with the bases of these devices complete the power-control network, which acts to deliver a predetermined net unidirectional heating power to the stylus absenting any externally-induced variation in the bias voltage at control point 49. The level of voltage at this point is automatically varied to increase the conduction times of devices 45 and 46, and, hence, to increase the heating power delivered to and the resulting temperature of the stylus, when the frequency and amplitude of the signals being recorded warrant the change. In this connection, the input signals applied to pen motor 19 are also coupled to an isolation or buffer amplifier stage 50, through a large capacitor 51 which freely passes the frequencies of interest; the pen motor is thus not unduly loaded by the control circuitry. Corresponding signals are developed across resistance 52, and are thence passed on as unidirectional half-cycles to an R-C integrator network through action of a half-wave rectifying diode 53. A relatively small capacitance 54 in shunting relation to the integrator network by-passes very high frequency components, such that signals of relatively high frequency but small amplitude will essentially be cut off and will not cause excessive stylus heat to be developed. The effective time constant for the integrator network is selected such that the capacitor 55 will charge rapidly through resistance 56 but will discharge relatively slowly through the associated relatively high impedance circuitry. Transistors 57 and 58 form a buffer amplifier arrangement responding to the capacitor charge conditions, and this is followed by a power amplifier stage formed by transistor 59; signals from the latter are injected at point 49 to effect the required control of the heating power supplied to the stylus. A suitable D-C source 60 provides a supply for the control circuitry. Very low frequency variations in the input signal are blocked by coupling capacitance 51, and very high frequency low-amplitude variations are by-passed via capacitance 54. Under other conditions, when signals of relatively high amplitudes and of relatively moderate to high frequency are being processed, the integrator network and associated circuitry will cause the bias at control point 49 to dictate essentially proportional increases in stylus heating.

In other practices, the specifically-illustrated circuits need not be employed where equivalent results are otherwise obtainable. The illustrated semiconductor devices may be replaced by other valving, for example, and when the input signals are not electrical they may be converted into that convenient form by suitable translating equipment.

What I claim as new and desire to secure by Letters Patent of the United States is:

1. Recorder apparatus or the like of the type which utilizes a thermally-responsive record medium to produce substantially permanent records, comprising stylus means including a heater element exposed to the ambient atmosphere and subject to cooling by convection at a relatively high rate when moved relatively rapidly over a relatively wide range of permissible motion, said heater element comprising dissimilar-material elements having a thermoelectric junction therebetween, means for positioning the record medium and said stylus means in a relation to one another wherein heating by said heater element effects recording on said record medium, motive means for producing relative movements between said stylus and record medium responsive to input signals, means producing electrical control signals characterizing frequency and amplitude of variations in said input signals, and means responsive to said electrical control signals providing a controlled supply of current through said junction in the heat-emitting mode, said last-named means comprising controlled rectifier means including controlled semiconductor devices in a full-wave rectifying network, and means applying said control signals in control of conduction of said rectifier means, and means for connecting an alternating current source with said thermoelectric junction through said rectifier means.

2. Recorder apparatus or the like of the type which utilizes a thermally-responsive record medium to produce substantially permanent records, comprising stylus means including an electrical heater element, means for positioning the record medium and said stylus means in a relation to one another wherein heating by said heater element effects recording on said record medium, a pen motor producing mechanical output movements between said stylus and record medium responsive to input signals in the form of electrical input signals having variable frequencies and amplitudes, means producing electrical control signals characterizing frequency and amplitude of variations in said input signals including an electrical integrator, means rectifying said input signals and applying the rectified signals to said integrator, means removing electrical energy from said integrator at a predetermined rate, and means deriving said control signals from the integrated signals in said integrator, and means responsive to said electrical control signals providing a controlled supply of electrical power to said heater element.

3. Recorder apparatus as set forth in claim 2 wherein said integrator includes a resistance and capacitance having a time constant permitting relatively rapid charging of said capacitance, wherein said means removing energy discharges said capacitance relatively slowly, and wherein said means rectifying and applying said input signals includes a series-connected capacitance blocking relatively low frequency input signals, and a series-connected diode.

4. Recorder apparatus as set forth in claim 3 wherein said means rectifying and applying said input signals further includes a relatively small capacitance in a shunting relation which by-passes relatively high frequency signals away from said integrator.

5. Recorder apparatus as set forth in claim 4 wherein said means responsive to said control signals comprises controlled semiconductor devices, means connecting said semiconductor devices in a full-wave rectifying network with said heater element as a load therefor, means for applying alternating current excitation to said network, and means applying said control signals to said semiconductor devices as bias controlling the conduction times of said semiconductor devices.

6. Recorder apparatus as set forth in claim 5 wherein said network includes means biasing said semiconductor devices to conduct during predetermined times in the absence of said control signals, whereby to establish a predetermined minimum flow of heating power to said heater element, and wherein said means applying said control signals supplies bias to said semiconductor devices increasing the conduction times thereof upon increase in frequency and amplitude of said input signals.

7. Recorder apparatus as set forth in claim 6 wherein said heater element comprises dissimilar-material elements having a thermoelectric junction therebetween, and wherein said network supplies current to said junction in the heat-emitting mode.

8. In a recorder or the like having a thermally-responsive record medium which produces visible records, thermal writing means including an electrical heater, and motive means for moving the thermal writing means relative to the record medium in a contacting relationship responsive to electrical input signals having variable frequencies and amplitudes, an R-C integrator network, means responsive to said input signals applying half-wave rectified signals to said integrator network, relatively high impedance means connected in relatively slow-discharging relation to the capacitance of said integrator network, the time constant of said network providing a relatively fast charging rate for said capacitance, controlled means providing at least a predetermined minimum supply of electrical power to said heater, and means responsive to the values of voltage across said capacitance applying electrical bias signals to said controlled means to increase the supply of electrical power to said heater above said predetermined minimum by amounts characterizing frequency and amplitude of said input signals.

9. In a recorder or the like as set forth in claim 8, said means responsive to said input signals including a first capacitance blocking signals at and near D-C values.

10. In a recorder or the like as set forth in claim 9, said means responsive to said input signals including a second relatively small capacitance in shunting relation to said integrator and by-passing relatively high frequency signals.

11. In a recorder or the like as set forth in claim 8, said controlled means comprising controlled rectifier means the conduction time of which is variable with said bias signals, and means for connecting said heater with an alternating current source through said controlled rectifier means.

12. In a recorder or the like as set forth in claim 11, said controlled means comprising a transformer connected with said source and having a center-tapped secondary, a pair of controlled semiconductor devices each having a rectifying path therethrough and a control region, means separately connecting the rectifying path of each of said devices serially with said heater across a different half of said secondary, means biasing said control regions of said devices to establish said minimum supply and means applying said bias signals to said control regions to increase said supply of power by amounts characterizing frequency and amplitude of said input signals.

13. In a recorder or the like as set forth in claim 12, said heater comprising dissimilar-material elements having a thermoelectric junction therebetween, and wherein said means separately connecting said rectifying paths connects said junction to receive current therethrough in the heat-emitting mode through both of said devices.

References Cited

UNITED STATES PATENTS 2,644,738    7/1953    Gardner _____ 346—76
3,334,352    8/1967    Abbondante et al. _____ 346—76

RICHARD B. WILKINSON, *Primary Examiner.*

JOSEPH W. HARTARY, *Assistant Examiner.*